Figures 1, 2:
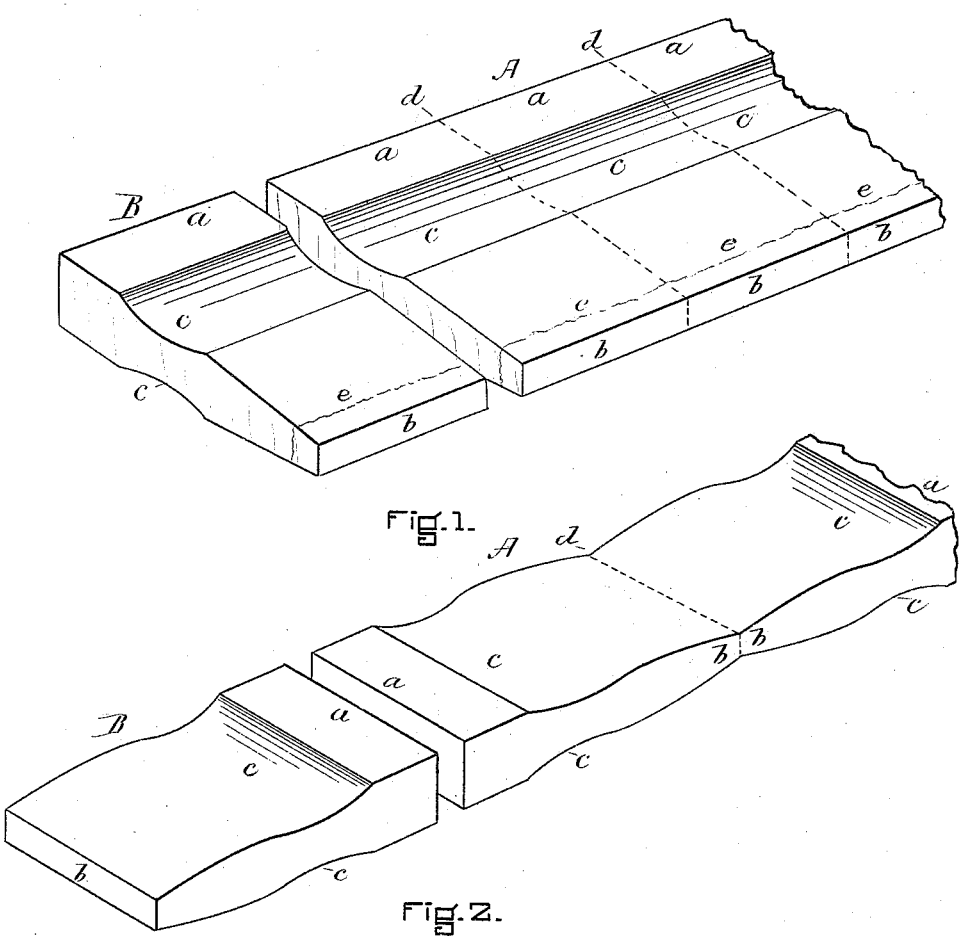

(No Model.)

J. W. BOWERS.
BLANK FOR AXES AND SIMILAR TOOLS.

No. 311,866. Patented Feb. 10, 1885.

WITNESSES

INVENTOR
John W. Bowers

UNITED STATES PATENT OFFICE.

JOHN W. BOWERS, OF EAST DOUGLAS, ASSIGNOR TO THE DOUGLAS AXE MANUFACTURING COMPANY, OF BOSTON, MASSACHUSETTS.

BLANK FOR AXES AND SIMILAR TOOLS.

SPECIFICATION forming part of Letters Patent No. 311,866, dated February 10, 1885.

Application filed February 20, 1884. (No model.)

*To all whom it may concern:*

Be it known that I, JOHN W. BOWERS, of East Douglas, in the county of Worcester and Commonwealth of Massachusetts, have invented a new and useful Improvement in Making Blanks for Axes and Similar Articles which are to have an eye formed therein; and the following is a specification thereof.

This invention relates, particularly, to the primary operations employed in producing blanks from which axes and kindred articles are to be manufactured; and it consists of a bar of metal made up of an indefinite number of such blanks connected together in series, which are to be separated by cutting the bar into short lengths corresponding to the blanks desired.

The operation of producing this continuous bar acts upon all sides of each blank of the connected series except the edges, where they are joined, and forms them into approximately the same shape as the corresponding sides of the finished article intended to be manufactured from the blank, with the modification that across each blank at the part where the eye is to be afterward punched therein two diametrically-opposite grooves are made of substantially the same form and dimensions as one-half of the finished eye. The operation of separating the blanks by cutting from the continuous series forms the two edges where they were connected.

In practicing my invention the connected series of blanks may be produced in the bar either with their length from head to bit or working end transverse to the length of the bar and the said diametrically-opposite grooves parallel thereto, or with their length from head to bit end parallel to the length of the bar and the said diametrically-opposite grooves transverse thereto, and in the latter case it will be found more advantageous to produce the blanks connected alternately by two head ends and then two bit ends.

Heretofore it has been customary to make axes and similar articles either by cutting a bar of metal into pieces of the desired size and weight and forming the blanks from these, or by forming the blanks one at a time on the end of a bar and then cutting them off.

By means of my improvement much time and labor is saved, and consequently such blanks can be more rapidly, easily, and economically produced, and either commercial bar-iron or what is known as "homogeneous iron" or "low-carbon steel" may be employed.

In Figure 1 of the drawings, A represents a bar formed with an indefinite number of ax-blanks connected in series, having their length from head to bit transverse to the length of the bar, and the said grooves across the eye portion parallel thereto; and B represents a blank cut from such bar.

In Fig. 2, A represents a bar formed with the series of ax-blanks alternately connected by two head ends and two bit ends, having their length from head to bit parallel to the length of the bar, and the said grooves across the eye portion transverse thereto; and B represents a blank cut therefrom.

In the drawings the same letters indicate similar parts, to wit: $a$, the head ends of the blanks; $b$, the bit ends; $c$, the diametrically-opposite grooves across the eye portions of the several blanks; $d$, the places where the blanks are to be separated by cutting, (indicated by dotted lines running transversely of the bars.)

When the metal is to be rolled into the form shown in Fig. 2, commercial bar-iron may be successfully used, as the "grain" of the iron will be parallel with the length of the blank from head to bit; but when the bar is to be rolled into the form shown in Fig. 1, I find it preferable to roll the bar from an ingot of homogeneous metal, and instead of welding on a piece of steel for the cutting or working edge of the tool, according to the usual method, I cast this ingot of two different grades of steel, in different parts and in such proportions that when rolled into a bar the greater part, or that which will form the poll of the ax, shall be low-carbon steel, and the lesser part along the thinner edge of the bar, or that which will form the bit of the ax, shall be high-carbon steel. This strip of high steel can be readily forged into a cutting-edge or such other form as the nature of the tool desired requires, and obviates the necessity of welding on a piece for that purpose. The dividing-line between the high and low carbon steel is indicated in Fig. 1 by a broken line, e e, running parallel to the grooves c near the bit ends b of the series of blanks.

I am aware that strips or plates of homogeneous metal made up in strata of two different grades of steel have been used in various manufactures; but by my improved method of making blanks for axes and similar articles I am enabled to use to great advantage bars of metal thus formed.

My invention has especial reference to forming in connected series blanks of the kind above referred to, in which an amount of metal substantially equal to that which must be displaced in forming the eye is removed from the outside of each blank across the eye portion in the form of diametrically-opposite depressions by the primary operation of producing the series in the form of a bar, so that when the blanks have been cut therefrom the eyes may be readily formed by simply splitting the metal between such depressions and without removing any metal from the blanks.

It is obvious that this invention may also be practiced by rolling or otherwise forming in one bar a multiple series of blanks located therein side by side, and to be afterward separated—as, for instance, a bar containing two such bars as that shown in Fig. 1, joined together along the edge a a at the head ends of the blanks, or along the edge b b at the bit ends of the blanks, or a bar like that shown at Fig. 2, but of the width of two blanks, the gist of this invention being a bar containing a series, whether simple or multiple, of blanks for axes or other similar tools in each of which an eye is to be made, formed with diametrically-opposite depressions across those portions thereof corresponding to the locations for the eyes in the several blanks.

What I claim is—

1. A metal bar substantially such as described, from which to cut blanks for axes, ax-polls, or other like articles, in each of which an eye is to be subsequently punched, which bar has the external form of a connected series of such blanks, approximately of the same shape as that of the article desired, except at those portions thereof corresponding to the location of the eye to be afterward made in the blank, and there having diametrically-opposite grooves or depressions, each of such form and dimensions as to substantially compensate for the subsequent displacement of metal required in punching the eye after each blank has been cut from the bar.

2. The herein-described bar of metal from which to cut blanks for axes or ax polls having approximately the same shape in transverse section as that of the desired blank taken perpendicularly to the axis of the eye, and especially having throughout its length along those portions where the eyes of the several blanks are to be located two diametrically-opposite grooves, each of substantially the same form and dimensions as one-half of the finished eye to be subsequently punched in the respective blanks after they have been cut from the bar, all substantially as described and shown.

JOHN W. BOWERS.

Witnesses:
JOHN T. KENNERK,
GEORGE H. HARLOW.